(No Model.)
C. P. SYKES.
SPRING GEAR FOR VEHICLES.
No. 258,151. Patented May 16, 1882.
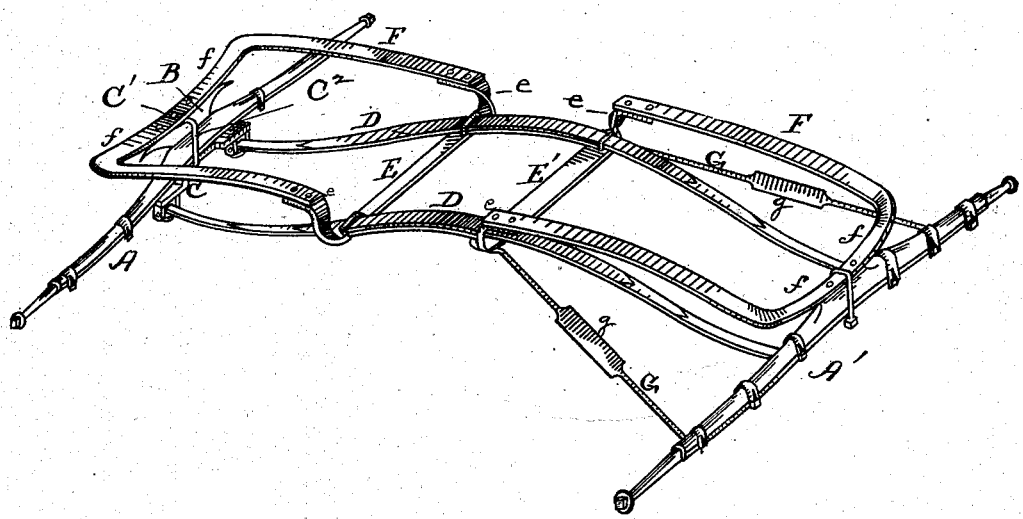
WITNESSES
Samuel E. Thomas.
J. Edward Warren
INVENTOR
Casper P. Sykes
By W. W. Leggett,
ATTORNEY

UNITED STATES PATENT OFFICE.

CASPER P. SYKES, OF PINCKNEY, MICHIGAN.

SPRING-GEAR FOR VEHICLES.

SPECIFICATION forming part of Letters Patent No. 258,151, dated May 16, 1882.

Application filed July 28, 1881. Renewed March 23, 1882. (No model.)

*To all whom it may concern:*

Be it known that I, CASPER P. SYKES, of Pinckney, county of Livingston, State of Michigan, have invented a new and useful Improvement in Spring-Gears for Vehicles; and I declare the following to be a full, clear, and exact description of the same, such as will enable others skilled in the art to which it pertains to make and use it, reference being had to the accompanying drawing, which forms a part of this specification.

My invention consists of the combinations of devices and appliances hereinafter described, and more particularly pointed out in the claims.

The drawing is a perspective view of an apparatus embodying my invention.

This invention is designed as an improvement upon the spring-gear patented to me June 21, 1881, No. 243,173. In that device two longitudinal and parallel springs extended from beneath the rear axle forward to the ends of a cross piece located below the forward axle. These springs were united at two points between the front and rear axles by bars, the ends of which extended up and formed bearings for the vehicle-body. There were supplementary springs or bars, which connected the sides of the body at the front with the extremities of the bolster, and similar bars or springs at the rear, which connected with the outer ends of the rear axle.

The improved construction is as follows:

A is the front, and A' the rear, axle of a vehicle.

B is the bolster, and C a cross-bar beneath the forward axle, secured thereto by the king-bolt C' and stirrup or clip C².

D D are the longitudinal parallel springs, extending from the rear axle forward to the extremities of the cross-bar beneath the forward axle.

E E' are cross-bars, which connect the two springs and have their ends *e e* bent up to form bearings for the vehicle-body.

F is a U-shaped spring, the ends of which are connected with the bearings *e e*, and the loop is fastened to the upper side of the bolster at its middle point. Another similar U-shaped spring F is similarly connected, as shown, with the rear axle at its middle point. The portions *f* of these springs which are adjacent to their central points extend across the vehicle in a direct, or nearly direct, line, so as to serve the same purpose as would be effected by semi-elliptic springs located at these same points.

G represents stay-bars to steady the structure and give stability to its rear axle. These bars G may be rigid and secured by a suitable stirrup to the under side of the rear axle; but I prefer that they should be made with a springing section, *g*, at some point intermediate between its extremities. Such construction enables it to serve equally well the purposes of a stay-rod, yet renders the whole structure more elastic than would be the case if it were a rigid bar. A spring-gearing of this character is very strong and elastic, yet of sufficient stability to avoid any disagreeable rocking or swaying motion.

When in use the body of the vehicle, as it descends, brings into play the semi-elliptic or cross portions of the springs F, and the extremities of the said springs F sustain directly the adjacent portions of the body.

What I claim is—

1. In a spring-gear for vehicles, the combination, with longitudinal springs extending from the rear axle to the forward end of the vehicle, of a U-shaped spring having its extremities connected to the longitudinal springs and its central portion attached to the bolster, and a similar U-spring having its extremities connected with the longitudinal spring and its middle point attached to the rear axle, substantially as described.

2. In a spring-gear for vehicles, the combination, with longitudinal springs extending from the rear axle forward to the front of the vehicle, of a U-shaped spring having its arms connected with the longitudinal springs between the axles and its middle portion attached to the rear axle, substantially as described.

3. In a spring-gear for vehicles, the combination, with longitudinal springs extending from the rear axle forward to the front of the vehicle, of a U-shaped spring having its extremities connected with the longitudinal springs between the axles, and its middle point attached to the bolster, substantially as described.

4. A spring-gear for vehicles, consisting of two parallel longitudinal springs extending from the rear axle to a cross-bar beneath the forward axle, cross-pieces E E', the U-springs F, and stay-bars G, substantially as described.

In testimony whereof I sign this specification in the presence of two witnesses.

CASPER P. SYKES.

Witnesses:
G. H. STOEKEN,
G. W. HOFF.